(12) United States Patent
Carter et al.

(10) Patent No.: US 8,286,232 B2
(45) Date of Patent: Oct. 9, 2012

(54) SYSTEM AND METHOD FOR TRANSPARENT CLOUD ACCESS

(75) Inventors: Stephen R. Carter, Spanish Fork, UT (US); Carolyn Bennion McClain, Springville, UT (US); Jared Patrick Allen, Sandy, UT (US); Dale Robert Olds, Draper, UT (US); Lloyd Leon Burch, Payson, UT (US); Jaimon Jose, Bangalore (IN)

(73) Assignee: Novell, Inc., Prov, UT (US)

( * ) Notice: Subject to any disclaimer, the term of this patent is extended or adjusted under 35 U.S.C. 154(b) by 379 days.

(21) Appl. No.: 12/612,841

(22) Filed: Nov. 5, 2009

(65) Prior Publication Data
US 2010/0235903 A1    Sep. 16, 2010

Related U.S. Application Data

(60) Provisional application No. 61/160,038, filed on Mar. 13, 2009.

(51) Int. Cl.
*G06F 17/00* (2006.01)
(52) U.S. Cl. .................................................. 726/15
(58) Field of Classification Search .................. None
See application file for complete search history.

(56) References Cited

U.S. PATENT DOCUMENTS

| | | | |
|---|---|---|---|
| 5,428,738 A | 6/1995 | Carter et al. |
| 5,608,903 A | 3/1997 | Prasad et al. |
| 5,677,851 A | 10/1997 | Kingdon et al. |
| 5,758,344 A | 5/1998 | Prasad et al. |
| 5,784,560 A | 7/1998 | Kingdon et al. |
| 5,787,175 A | 7/1998 | Carter |
| 5,828,893 A | 10/1998 | Wied et al. |
| 5,832,275 A | 11/1998 | Olds |
| 5,832,487 A | 11/1998 | Olds et al. |
| 5,870,564 A | 2/1999 | Jensen et al. |
| 5,878,415 A | 3/1999 | Olds |
| 5,878,419 A | 3/1999 | Carter |
| 5,956,718 A | 9/1999 | Prasad et al. |
| 6,055,575 A | 4/2000 | Paulsen et al. |
| 6,067,572 A | 5/2000 | Jensen et al. |
| 6,108,619 A | 8/2000 | Carter et al. |
| 6,119,230 A | 9/2000 | Carter |
| 6,185,612 B1 | 2/2001 | Jensen et al. |
| 6,219,652 B1 | 4/2001 | Carter et al. |
| 6,275,819 B1 | 8/2001 | Carter |
| 6,405,199 B1 | 6/2002 | Carter et al. |
| 6,459,809 B1 | 10/2002 | Jensen et al. |

(Continued)

OTHER PUBLICATIONS

Communication, European Search Report, Application No. 10155850.0, 6 pages, Jan. 7, 2011, European Patent Office, Rijswijk Netherlands.

*Primary Examiner* — Brandon Hoffman
(74) *Attorney, Agent, or Firm* — Haynes and Boone, LLP

(57) ABSTRACT

System and method for transparent cloud access are described. In one embodiment, the system comprises an enterprise computing environment maintained by an enterprise and a cloud computing environment maintained by a cloud provider; and a secure bridge mechanism for interconnecting the enterprise computing environment and the cloud computing environment. The secure bridge mechanism comprises a first secure bridge portion associated with the enterprise and a second secure bridge portion associated with the cloud computing environment. The first and second secure bridge portions interoperate to provide transparent and secure access by resources of one of the computing environments to those of the other computing environment.

20 Claims, 3 Drawing Sheets

U.S. PATENT DOCUMENTS

| | | | |
|---|---|---|---|
| 6,519,610 B1 | 2/2003 | Ireland et al. |
| 6,539,381 B1 | 3/2003 | Prasad et al. |
| 6,601,171 B1 | 7/2003 | Carter et al. |
| 6,647,408 B1 | 11/2003 | Ricart et al. |
| 6,650,777 B1 | 11/2003 | Jensen et al. |
| 6,697,497 B1 | 2/2004 | Jensen et al. |
| 6,738,907 B1 | 5/2004 | Carter |
| 6,742,035 B1 | 5/2004 | Zayas et al. |
| 6,742,114 B1 | 5/2004 | Carter et al. |
| 6,760,843 B1 | 7/2004 | Carter |
| 6,772,214 B1 | 8/2004 | McClain et al. |
| 6,826,557 B1 | 11/2004 | Carter et al. |
| 6,862,606 B1 | 3/2005 | Major et al. |
| 6,993,508 B1 | 1/2006 | Major et al. |
| 7,043,555 B1 | 5/2006 | McClain et al. |
| 7,107,538 B1 | 9/2006 | Hinckley et al. |
| 7,152,031 B1 | 12/2006 | Jensen et al. |
| 7,177,922 B1 | 2/2007 | Carter et al. |
| 7,185,047 B1 | 2/2007 | Bate et al. |
| 7,197,451 B1 | 3/2007 | Carter et al. |
| 7,286,977 B1 | 10/2007 | Carter et al. |
| 7,299,493 B1 | 11/2007 | Burch et al. |
| 7,316,027 B2 | 1/2008 | Burch et al. |
| 7,334,257 B1 | 2/2008 | Ebrahimi et al. |
| 7,356,819 B1 | 4/2008 | Ricart et al. |
| 7,363,577 B2 | 4/2008 | Kinser et al. |
| 7,376,134 B2 | 5/2008 | Carter et al. |
| 7,386,514 B2 | 6/2008 | Major et al. |
| 7,389,225 B1 | 6/2008 | Jensen et al. |
| 7,426,516 B1 | 9/2008 | Ackerman et al. |
| 7,467,415 B2 | 12/2008 | Carter |
| 7,475,008 B2 | 1/2009 | Jensen et al. |
| 7,505,972 B1 | 3/2009 | Wootton et al. |
| 7,506,055 B2 | 3/2009 | McClain et al. |
| 7,552,468 B2 | 6/2009 | Burch et al. |
| 7,562,011 B2 | 7/2009 | Carter et al. |
| 7,606,229 B1 * | 10/2009 | Foschiano et al. ............ 370/392 |

* cited by examiner

SYSTEM AND METHOD FOR TRANSPARENT CLOUD ACCESS

CROSS-REFERENCE TO RELATED APPLICATIONS

This application claims the benefit under Title 35, United States Code §119(e) of U.S. Provisional Patent Application No. 61/160,038 filed on Mar. 13, 2009, the disclosure of which is incorporated herein by reference in its entirety. This application is related to the following commonly-assigned, co-pending applications, each of which is also incorporated herein by reference in its entirety:

1. U.S. patent application Ser. No. 12/612,807 filed on Nov. 5, 2009, now U.S. Pat. No. 8,065,395 issued on Nov. 22, 2011;
2. U.S. patent application Ser. No. 12/612,818 filed on Nov. 5, 2009;
3. U.S. patent application Ser. No. 12/612,834 filed on Nov. 5, 2009;
4. U.S. patent application Ser. No. 12/612,882 filed on Nov. 5, 2009;
5. U.S. patent application Ser. No. 12/612,895 filed on Nov. 5, 2009;
6. U.S. patent application Ser. No. 12/612,903 filed on Nov. 5, 2009;
7. U.S. patent application Ser. No. 12/612,925 filed on Nov. 5, 2009;
8. U.S. patent application Ser. No. 12/613,077 filed on Nov. 5, 2009;
9. U.S. patent application Ser. No. 12/613,098 filed on Nov. 5, 2009;
10. U.S. patent application Ser. No. 12/613,112 filed on Nov. 5, 2009; and
11. U.S. patent application Ser. No. 12/197,833 filed on Aug. 25, 2008, now U.S. Pat. No. 8,036,396 issued on Oct. 11, 2011.

BACKGROUND

Cloud computing is a type of computing in which dynamically scalable and typically virtualized resources are provided as services via the Internet. As a result, users need not, and typically do not, possess knowledge of, expertise in, or control over the technology and/or infrastructure implemented in the cloud. Cloud computing generally incorporates infrastructure as a service ("IaaS"), platform as a service ("PaaS"), and/or software as a service ("SaaS"). In a typical embodiment, cloud computing services provide common applications online, which applications are accessed using a web browser and the software and data for which are stored on servers comprising the cloud.

Cloud computing customers typically do not own or possess the physical infrastructure that hosts their software platform; rather, the infrastructure is leased in some manner from a third-party provider. Cloud computing customers can avoid capital expenditures by paying a provider for only what they use on a utility, or resources consumed, basis or a subscription, or time-based, basis, for example. Sharing computing power and/or storage capacity among multiple lessees has many advantages, including improved utilization rates and an increase in overall computer usage.

With the advent of cloud computing and cloud storage, enterprise resources are not transparently accessible across enterprise and/or cloud boundaries via standard mechanisms, protocols and portals.

SUMMARY

One embodiment is a system for providing transparent cloud access. The system comprises an enterprise computing environment maintained by an enterprise and a cloud computing environment maintained by a cloud provider; and a secure bridge mechanism for interconnecting the enterprise computing environment and the cloud computing environment. The secure bridge mechanism comprises a first secure bridge portion associated with the enterprise and a second secure bridge portion associated with the cloud computing environment. The first and second secure bridge portions interoperate to provide transparent and secure access by resources of one of the computing environments to those of the other computing environment.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components and/or protocols not otherwise illustrated.

The embodiments described herein provide a mechanism for providing transparent cloud access. To this end, one or more embodiments described herein provide a method and mechanism allow transparent access of enterprise resources whether they are hosted in the enterprise or in one or more clouds.

Figure 1:
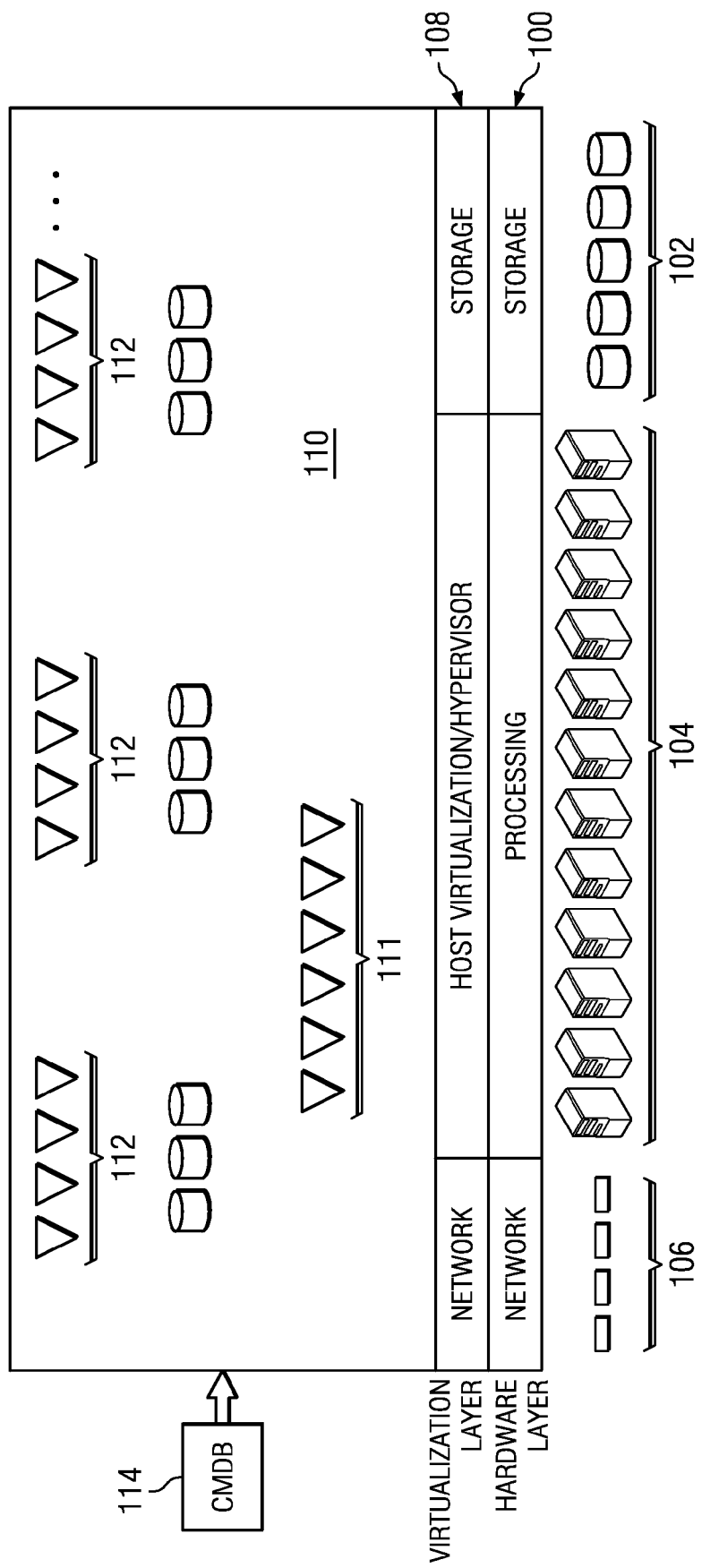
FIG. 1 illustrates an exemplary IaaS cloud structure such as may be implemented in one embodiment.

FIG. 1 illustrates an exemplary IaaS cloud structure. As shown in FIG. 1, the cloud structure includes a hardware layer 100 comprising storage assets 102, processing assets 104, and network assets 106. To facilitate usefulness of the cloud to a variety of enterprises, workloads are sponsored in the cloud as virtual machines possibly accessing virtualized storage and/or virtualized networks. This is accomplished via a virtualization layer 108. Thus, the hardware layer 100 is insulated from the actual workloads to be sponsored in the cloud at a layer 110 by the virtualization layer 108 hardware, storage, and networking so that the operating system selected by the enterprise can be sponsored on whatever hardware the cloud provider makes available. Having established the hardware and virtualization layers 100, 108, the assets 102, 104, and 106 are available in a standardized way to workloads hosted in the workload layer 110, which is the layer the customer typically views as the "cloud". It will be recognized that some of the workloads sponsored in the cloud, specifically, workloads 111, are workloads that are germane to the operation of the cloud and may consist of monitoring processes for enabling the cloud provider to monitor the health of the cloud, management processes to enable the cloud provider to ensure that service-level agreements are enforced, and so on.

Enterprises using the cloud are represented by virtualization processes and storage shown as workloads 112. These processes are typically started by an enterprise via a cloud portal or API utilized by administrative personnel or processes running at the enterprise or in the cloud. A typical cloud provider may be using standard ITIL practices and may utilize a configuration management database ("CMDB") 114, which affects the entire cloud infrastructure and which describes the practice and policies used for instantiating virtualized workloads and storage.

Figure 2:
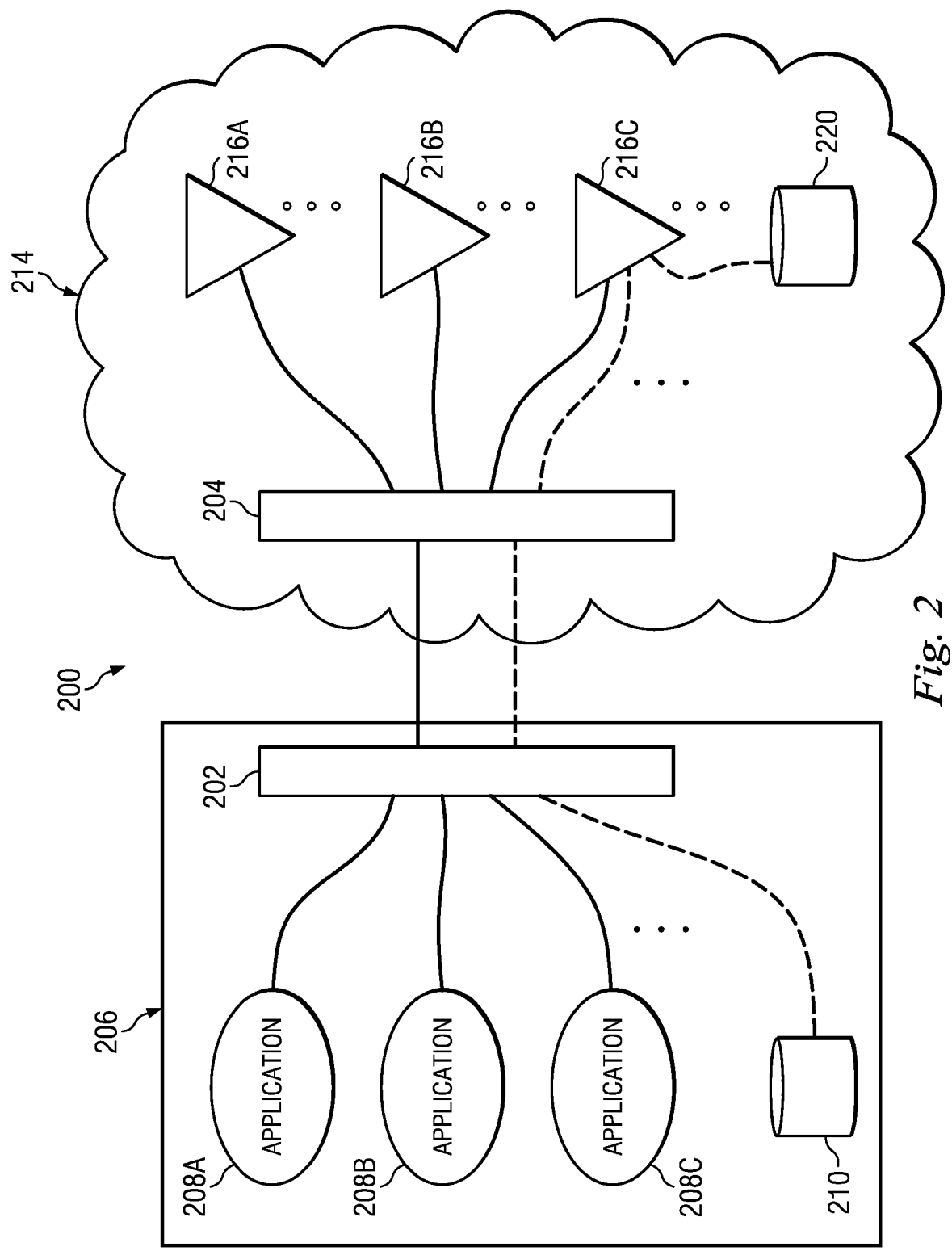
FIG. 2 illustrates a system for enabling transparent cloud access in accordance with one embodiment.

FIG. 2 is a flow diagram of one embodiment of a secure bridge mechanism 200 comprising first bridge portion 202 and a second bridge portion 204 for providing transparent cloud access. As will be described in detail below, the secure bridge mechanism 200 effectively spans the gulf between address spaces, thereby enabling transparent access to resources regardless of whether those resources reside within an enterprise 206, such as applications 208A-208C and storage medium 210, or within a cloud 214, such as workloads 216A-216C and storage medium 220, without requiring a hole to be punched in a firewall (not shown) of the enterprise 206. Accordingly, any of the workloads 216A-216C can access either of the storage media 210, 220, as well as the applications 208A-208C, transparently. Similarly, any of the applications 208A-208C can accesses either of the storage media 210, 220, as well as the workloads 216A-216C, transparently such that the cloud resources are, in effect, "annexed" into the enterprise 206 via the secure bridge mechanism 200.

In particular, the secure bridge mechanism 200 provides transparent port mapping and other transparent protocol mappings so that, for example, an LDAP bind to an LDAP directory from the process 208A will succeed whether the LDAP directory resides in the enterprise 206 or the cloud 214. As a result, embodiments described herein enable assets needed by the enterprise 206 to be migrated from the enterprise to the cloud 214 without requiring modification of the operation and/or configuration thereof.

In one embodiment, storage medium 210 may also be represented locally and within the cloud 214 as storage medium 220 as simultaneous instances, by caching, or with a synchronization model with an authoritative source designation providing scalability, failover and fault tolerance. The secure bridges 204, 212, can also function as a protocol proxy such that a native LDAP bind from applications 202A-202C can transparently access storage media 210, 220, and a likewise a native LDAP bind at any of the workloads 216A-216C can transparently access storage media 210 or 220. Note that other protocols can be transferred in the same manner and that storage can be incrementally expanded or contracted on either side.

Figure 3:
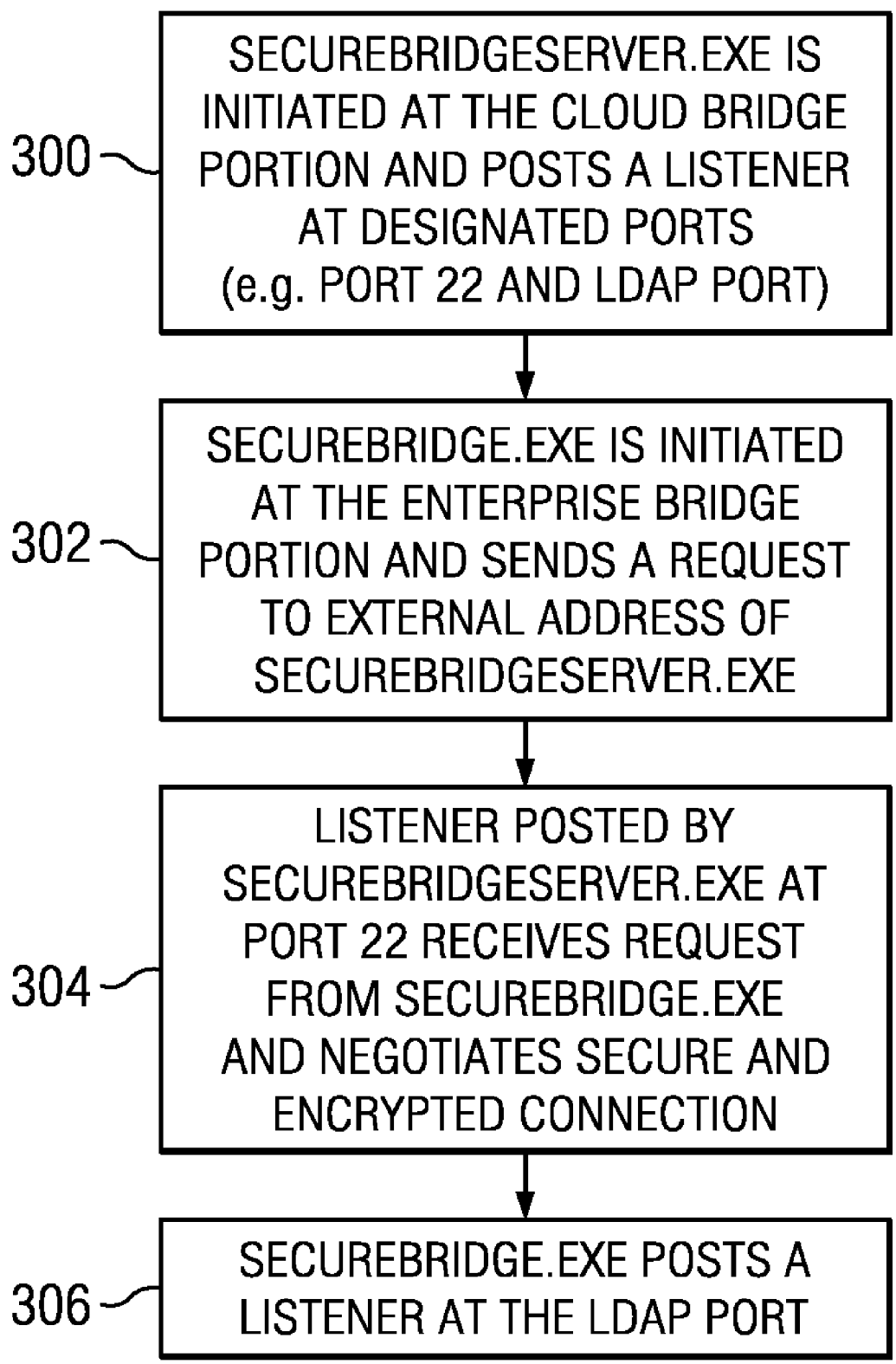
FIG. 3 is a flowchart illustrating exemplary operation of one embodiment of the secure bridge mechanism of FIG. 2.

It will be recognized that the secure bridge mechanism 200 can be implemented in any one of a number of different manners, including, but not limited to, Virtual Private Network ("VPN")-type technology, proxy tunneling, and SSH tunneling. FIG. 3 illustrates exemplary operation of one embodiment of the secure bridge mechanism 200. In the example shown in FIG. 3, in step 300, an automated process or cloud administrator initiates a "securebridgeserver.exe" process at the cloud bridge portion 204. The securebridgeserver.exe process posts a listener at one or more designated TCP ports. Such ports may include, but are not limited to SSH and LDAP ports. It will be recognized that listeners may be posted at other ports as necessary or desired. The listener(s) posted in step 300 wait for requests to come through on the respective port. With regard to the LDAP port, the listener posted thereto also acts as a reverse proxy as will be described.

In step 302, an automated process or enterprise administrator initiates a "securebridge.exe" process at the enterprise bridge portion 202. The securebridge.exe process accesses a designated external IP address (e.g., 151.155.94.122:22) corresponding to the securebridgeserver.exe process initiated in step 300. In step 304, the listener posted at port 22 by the securebridgeserver.exe process in step 300 receives the request from the securebridge.exe process and negotiates setup of a secure and encrypted connection between enterprise bridge portion 202 and the cloud bridge portion 204. It will be recognized that, because the connection negotiated in step 304 was initiated from within the enterprise 206 (i.e., from behind the enterprise firewall (not shown)), there is no need to punch a hole in the firewall. In step 306, the securebridge.exe process posts a listener on the LDAP port such that any LDAP calls from within the enterprise 206 will be picked up by the listener.

Once the secure bridge mechanism is set up as described in connection with FIG. 3, assuming a call to do a bind to an LDAP store that resides within the enterprise originates from a process running in the cloud, the listener posted at the LDAP port by securebridgeserver.exe receives the request and forwards it to the securebridge.exe process. The securebridge.exe process requests the bind and returns the requested information to the securebridsgeserver.exe process, which in turn returns it to the requesting process. Similarly, if the LDAP store resides in the cloud and a call to do an LDAP bind comes from a process running in the enterprise, the previously-described course of action is reversed. In either case, the details regarding how and where the bind is performed are transparent to the requesting process.

It will be recognized that various ones of the elements and/or modules described herein may be implemented using one or more general purpose computers or portions thereof executing software applications designed to perform the functions described or using one or more special purpose computers or portions thereof configured to perform the functions described. The software applications may comprise computer-executable instructions stored on computer-readable media. Additionally, repositories described herein may be implemented using databases or other appropriate storage media.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A system for providing transparent cloud access, the system comprising:
an enterprise computing environment;
a cloud computing environment;
a secure bridge mechanism for interconnecting the enterprise computing environment and the cloud computing environment, the secure bridge mechanism comprising:
a secure enterprise bridge portion associated with the enterprise computing environment; and
a secure cloud bridge portion associated with the cloud computing environment;
wherein the secure enterprise bridge portion is external to the cloud computing environment,
wherein the secure enterprise bridge portion is operable to initiate a process such that there is no need to punch a hole through a firewall of the enterprise computing environment, and
wherein the secure enterprise bridge portion and the secure cloud bridge portion interoperate to provide transparent and secure access by resources of one of the computing environments to resources within the other computing environment.

2. The system of claim 1 wherein each of the enterprise computing environment and cloud computing environment further comprises storage media.

3. The system of claim 2 wherein the secure enterprise bridge portion and the secure cloud bridge portion interoperate to provide transparent access by processes executing in the cloud computing environment to the storage media of the enterprise computing environment.

4. The system of claim 2 wherein the secure enterprise bridge portion and the secure cloud bridge portion interoperate to provide transparent access by processes executing in the enterprise computing environment to the storage media of the cloud computing environment.

5. The system of claim 1 wherein the secure bridge mechanism is implemented using Virtual Private Network ("VPN") technology.

6. The system of claim 1 wherein the secure bridge mechanism is implemented via a proxy.

7. The system of claim 1 wherein the secure bridge mechanism is implemented via SSH tunneling.

8. A method for providing transparent access to resources maintained within an enterprise computing environment and a cloud computing environment, the method comprising:
providing a secure bridge mechanism between the enterprise computing environment and the cloud computing environment, the providing a secure bridge mechanism comprising:
providing a first secure bridge associated with the enterprise computing environment, the first secure bridge being external to the cloud computing environment; and
providing a second secure bridge associated with the cloud computing environment; and
negotiating a connection between the first and second secure bridges to provide transparent access by resources of one of the computing environments to resources within the other computing environment,
wherein negotiating the connection includes initiating a process at the first secure bridge such that there is no need to punch a hole through a firewall of the enterprise computing environment.

9. The method of claim 8 wherein the resources of each of the enterprise computing environment and the cloud computing environment include storage media.

10. The method of claim 9 further comprising causing the first and second secure bridges interoperate to provide transparent access by processes executing in the cloud computing environment to the storage media of the enterprise computing environment.

11. The method of claim 9 further comprising causing the first and second secure bridges interoperate to provide transparent access by processes executing in the enterprise computing environment to the storage media of the cloud computing environment.

12. The method of claim 8 further comprising causing the first and second secure bridges to interoperate using Virtual Private Network ("VPN") technology.

13. The method of claim 8 further comprising causing the first and second secure bridges to interoperate via a proxy.

14. The method of claim 8 further comprising causing the first and second secure bridges to interoperate via SSH tunneling.

15. A system for providing transparent access to resources maintained within an enterprise computing environment and a cloud computing environment, the system comprising:
means for providing a secure bridge mechanism between the enterprise computing environment and the cloud computing environment, the providing a secure bridge mechanism comprising:
means for providing a first secure bridge associated with the enterprise computing environment, the first secure bridge being external to the cloud computing environment; and
means for providing a second secure bridge associated with the cloud computing environment; and
means for negotiating a connection between the first and second secure bridges to provide transparent access by resources of one of the computing environments to resources within the other computing environment
wherein means for negotiating the connection includes means for initiating a process at the first secure bridge such that there is no need to punch a hole through a firewall of the enterprise computing environment.

16. The system of claim 15 wherein the resources of each of the enterprise computing environment and the cloud computing environment include storage media.

17. The system of claim 16 further comprising means for causing the first and second secure bridges interoperate to provide transparent access by processes executing in the cloud computing environment to the storage media of the enterprise computing environment.

18. The system of claim 16 further comprising means for causing the first and second secure bridges interoperate to provide transparent access by processes executing in the enterprise computing environment to the storage media of the cloud computing environment.

19. The system of claim 15 further comprising means for causing the first and second secure bridges to interoperate using Virtual Private Network ("VPN") technology.

20. The system of claim 15 further comprising means for causing the first and second secure bridges to interoperate via a tunneling mechanism.

* * * * *